US 6,679,287 B2

(12) United States Patent
Huang

(10) Patent No.: US 6,679,287 B2
(45) Date of Patent: Jan. 20, 2004

(54) LEVEL ADJUSTER OF WATER SUPPLY OF WATER BOX

(75) Inventor: So-Mel Huang, Taichung (TW)

(73) Assignee: Chien Cheun Plastic Co., Ltd. (TW)

(*) Notice: Subject to any disclaimer, the term of this patent is extended or adjusted under 35 U.S.C. 154(b) by 0 days.

(21) Appl. No.: 10/150,866

(22) Filed: May 20, 2002

(65) Prior Publication Data

US 2003/0213053 A1 Nov. 20, 2003

(51) Int. Cl.[7] ............................................... F16K 31/18
(52) U.S. Cl. ..................................................... 137/444
(58) Field of Search ............................. 4/353; 137/442, 137/444

(56) References Cited

U.S. PATENT DOCUMENTS

| 2,911,000 A | * | 11/1959 | Doyle | 137/442 X |
| 2,986,155 A | * | 5/1961 | Doyle | 137/442 X |
| 3,194,258 A | * | 7/1965 | Grant | 137/442 X |
| 6,510,866 B2 | * | 1/2003 | Li | 137/444 X |

* cited by examiner

Primary Examiner—Robert M. Fetsuga

(57) ABSTRACT

A level adjuster of a water supply of a water box serves for adjusting the amount of water in a water box conveniently and easily. The level adjuster comprises a press, a supporting rod, an pressable button, a positioning seat, a pontoon, an inner water injecting tube and an outer water injecting tube of a water injector. The amount of water in the water box can be precisely controlled and the operation is easy without using any other auxiliary tool. No problem of element fatigue and change of water level occurs.

2 Claims, 6 Drawing Sheets

PRIOR ART FIG.1

LEVEL ADJUSTER OF WATER SUPPLY OF WATER BOX

FIELD OF THE INVENTION

The present invention relates to level adjusters, and particularly to a level adjuster of a water supply of a water box serves for adjusting the amount of water in a water box conveniently and easily. The amount of water in the water box can be precisely controlled and the operation is easy without any other auxiliary tool. No problem of element fatigue and change of water level.

BACKGROUND OF THE INVENTION

Stool has become a necessary device for the currently life, but generally, the water supplied to the stool is unadjustable and a large amount of water is supplied for each time the stool is used so that water is wasted. Tools are necessary for adjusting water supplied to the stool, however, this is inconvenient, and thus the user can not determine the water to flush a stool each time the stool is used.

A prior art water supply is illustrated in FIG. 1. The water supply has an inner water injecting tube 52 and an outer water injecting tube 51 and a pontoon 53. An outer side of the pontoon 53 is pivotally connected to a U shape elastomer 54. An upper and a lower section of the U shape elastomer 54 are installed with an upper positioning hole 541 and a lower positioning hole 542. A supporting rod 56 capable of being connected to a press 55 passes through an upper positioning hole 541 and a lower positioning hole 542. By the expanding elastic force of the U shape elastomer 54, the edges of the positioning holes 541 and 542 can be buckled to the supporting rod 56. When the U shape elastomer 54 are pressed at two ends thereof, the edges of the upper positioning hole 541 and the lower positioning hole 542 will disengage with the supporting rod 56 (the diameter of the upper and lower positioning holes 541 and 542 are slightly larger than the diameter of the supporting rod 56). The user can adjust the pontoon 53 to a desired level and the U shape elastomer 54 can be positioned on the supporting rod 56. Although this structure can adjust the water amount rapidly, but the advantage is that the edges of the upper and lower positioning holes 541 and 542 are obliquely buckled to the supporting rod 56. It is possible that the rod slides due to the buoyance of the pontoon 15. Especially when the U shape elastomer has elastic fatigue. Thereby, the water level to be controlled has a shift from the predict level, and the water stored is wasted due to change of level.

SUMMARY OF THE INVENTION

To achieve above objects, the present invention provides a level adjuster of a water supply of a water box comprising a press, a supporting rod, an pressable button, a positioning seat, a pontoon, an inner water injecting tube and an outer water injecting tube of a water injector. The user can press the pressable button to force the elastomer of the positioning seat to reduce backwards, and thereby, the positioning block will retract from the positioning groove of the supporting rod. Therefore, the user can adjust the level of the pontoon. After adjusting to a desire level, the pressable button is released. Then the elastomer of the positioning seat restores to drive the block to be buckled to the positioning groove of the supporting rod. After the level positioning operation is completed, and when it is stated to fill water into a water box, the pontoon will move to a predetermined height due to the buoyance of water, the pontoon will drive the press to press the water stop pin of the water supply. Thereby, by the present invention, the amount of water in the water box can be precisely controlled and the operation is easy without any other auxiliary tool. No problem of element fatigue and change of water level. The amount of water in the water box can be precisely controlled and the operation is easy without any other auxiliary tool. No problem of element fatigue and change of water level.

The various objects and advantages of the present invention will be more readily understood from the following detailed description when read in conjunction with the appended drawing.

DETAILED DESCRIPTION OF THE PREFERRED EMBODIMENTS

Figure 1:
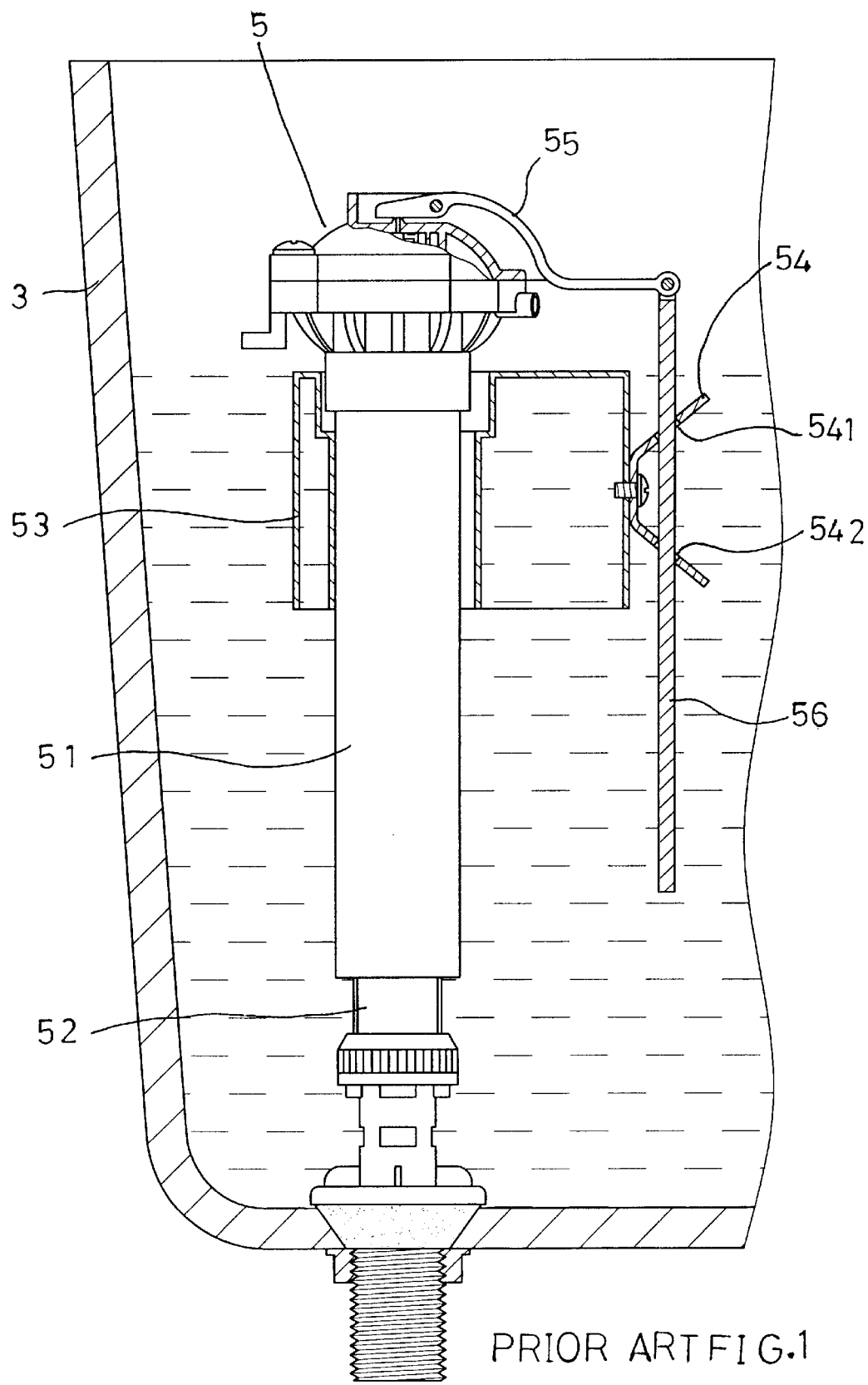
FIG. 1 is a schematic view of a prior art water supply of a water box.
Figure 2:
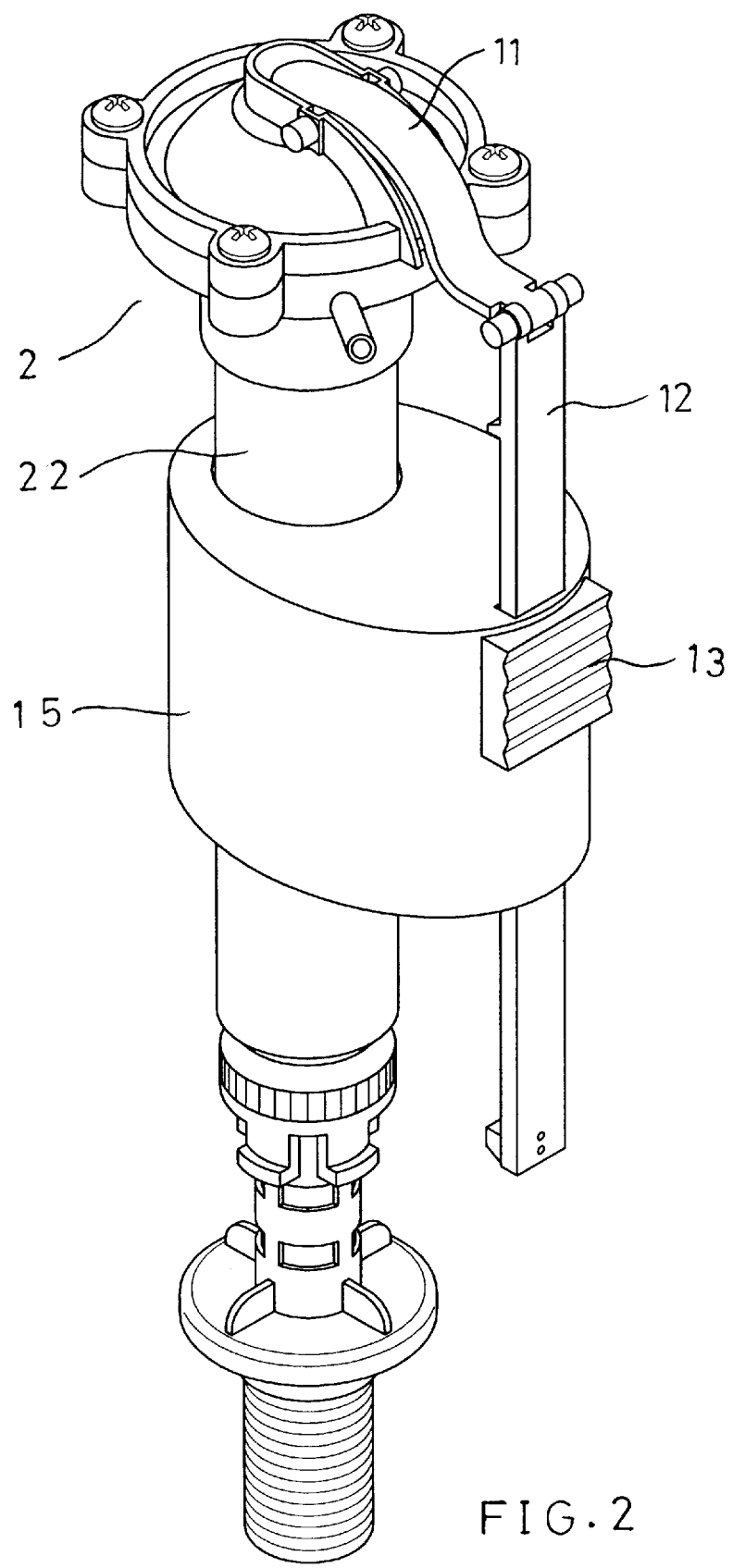
FIG. 2 is a schematic perspective view of the present invention.
Figure 3:
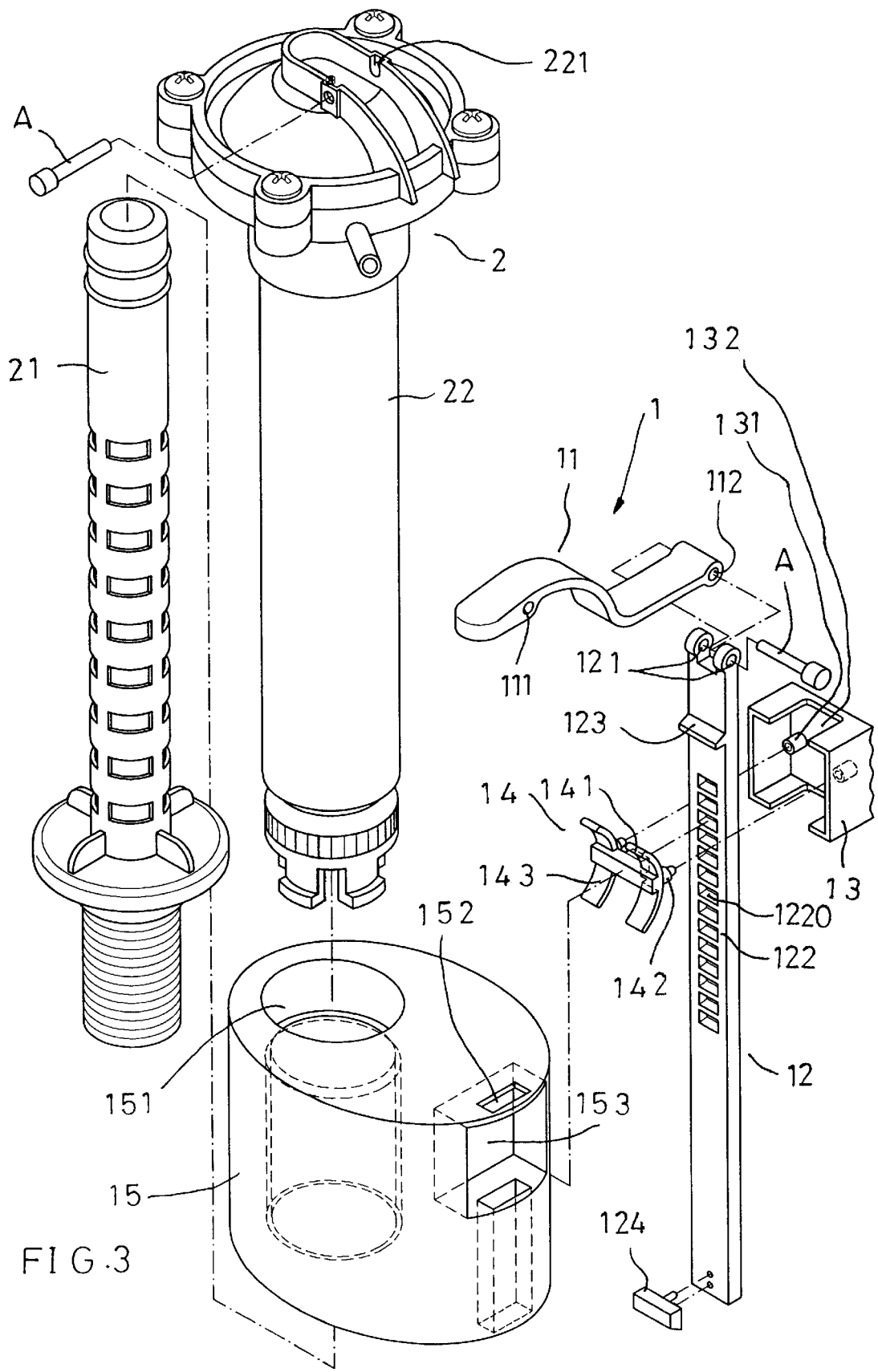
FIG. 3 is an exploded perspective view of the present invention.

Referring to FIGS. 2 and 3, the perspective view and exploded perspective view of the present invention are illustrated. The present invention includes a water supply 2 with a level adjusting device 1. The level adjusting device 1 is formed by a press 11, a supporting rod 12, an pressable button 13, a positioning seat 14, a pontoon 15, an inner water injecting tube 21 and and outer water injecting tube 22 of a water injector 2.

The press 11 has a front section. The front section has a first inserting hole 111 which is pivotally connected to a positioning hole 221 of the water supply 2 by a pin A. A distal end of the press 11 is installed with a second inserting hole 112 which is pivotally connected to a pivotal hole 121 at a top end of the supporting rod 12 by a pin A.

The supporting rod 12 has a top installed with the pivotal hole 121 corresponding to the second inserting hole 112 of the press 11. An inner side of the supporting rod 12 is installed with a groove row 122 formed by at least one positioning groove 1220. The groove row 122 of the supporting rod 12 has an upper limiting block 123 at an upper side thereof and a lower end of the supporting rod 12 is pivotally connected with a lower limiting block 124 which are utilized as an upper limit and a lower limit of the position pressable button 13 moving along the supporting rod 12.

The pressable button 13 has an inner side which is installed with a engaging hole for being inserted by the connecting posts 142 of the positioning seat 14. An upper and a lower side of the pressable button 13 are installed with corresponding notches 132 for confining the movement of the pressable button 13 and the supporting rod 12.

The positioning seat 14 has a transversal plate with two posts 142 at two ends of the plate. Each post 142 is installed with an elastomer 143. A positioning block 141 capable of buckling the supporting rod 12 and the positioning groove 1220 is installed between the two connecting posts 142.

The pontoon 15 has a round hole 151 at one side for being inserted by an outer water injecting tube 22 of the water supply 2. Another side of the pontoon 15 is installed with a via hole 152 for being inserted by the supporting rod 12. One lateral side of the via hole 152 is communicated with an opened receiving chamber 153 for receiving the pressable button 13.

Figure 4:
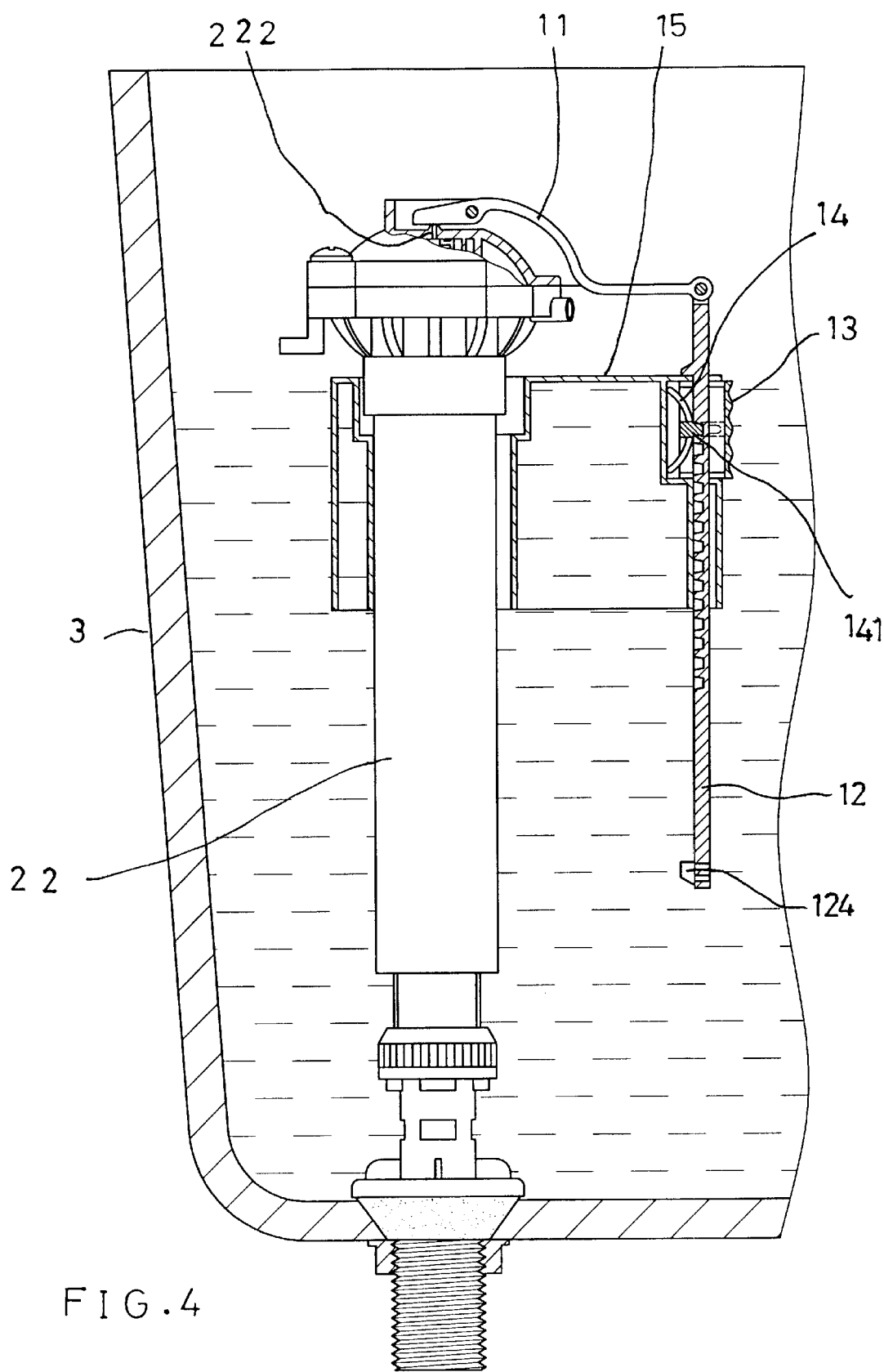
FIG. 4 is a schematic view showing the operation of the present invention.
Figure 5:
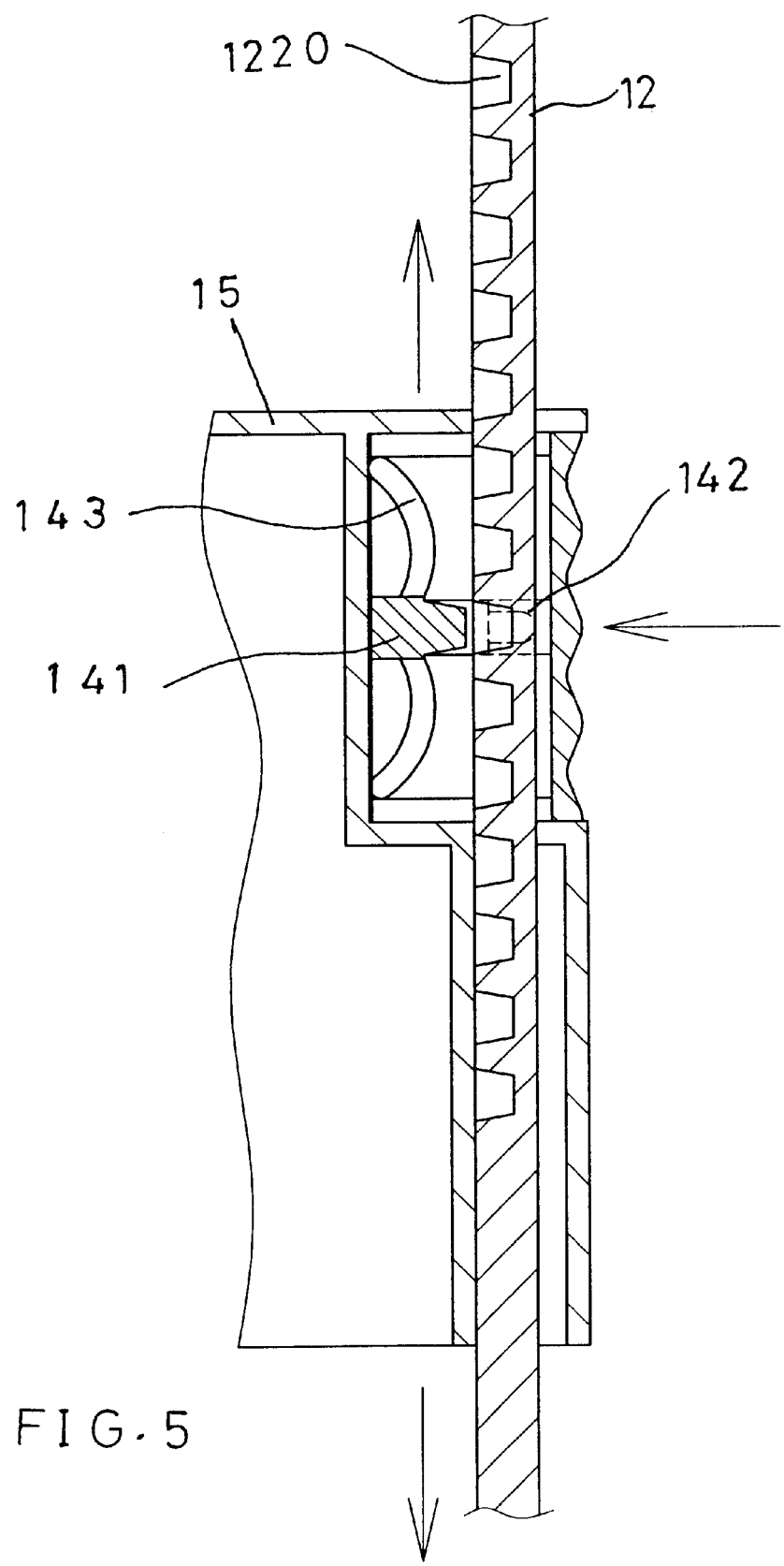
FIG. 5 is another schematic view of the operation of the present invention.
Figure 6:
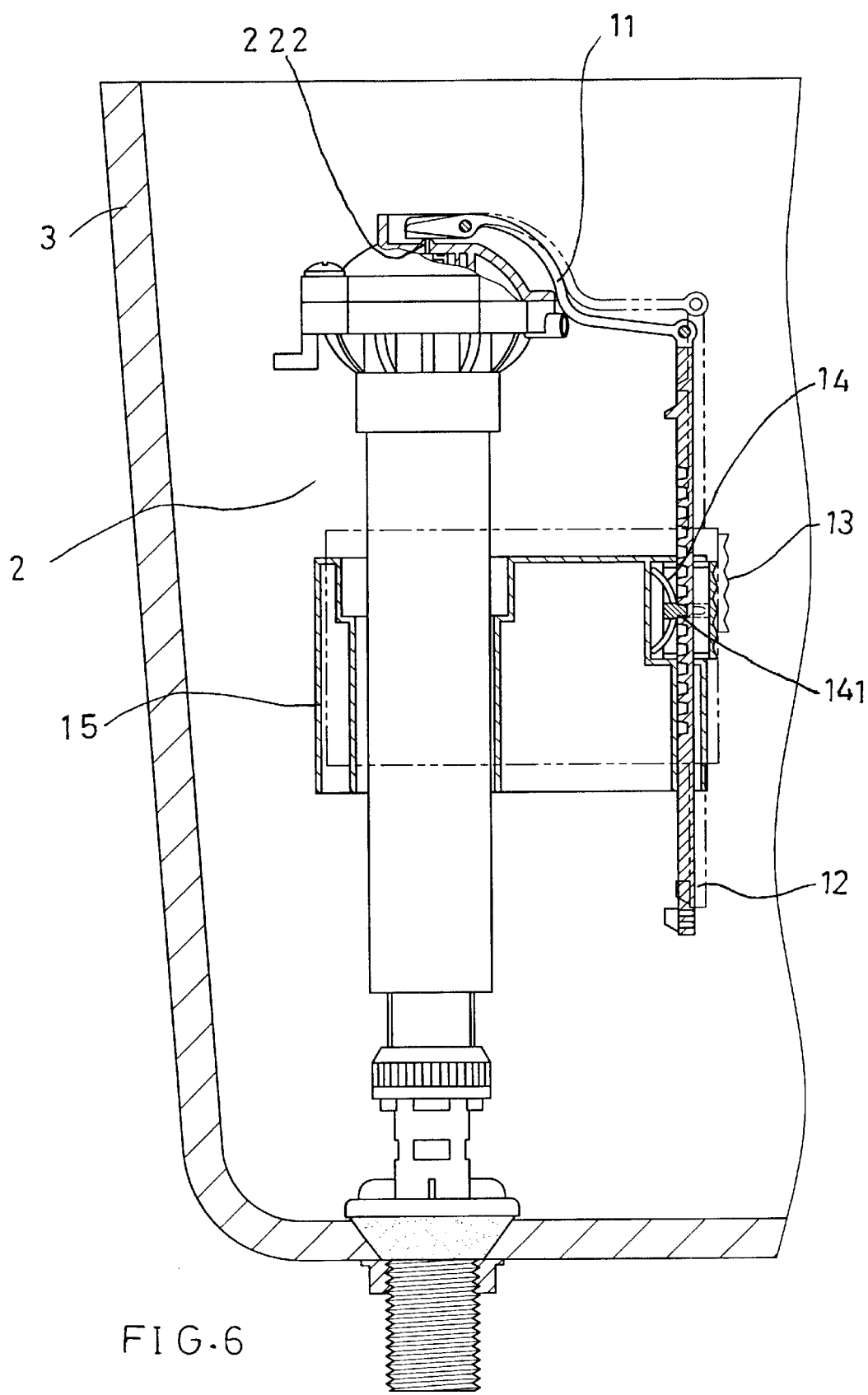
FIG. 6 is a further schematic view of the operation of the invention.

By above components, referring to FIGS. 4, 5, and 6, the user can press the pressable button 13 to force the elastomer 143 of the positioning seat 14 to reduce backwards, and thereby, the positioning block 141 will retract from the positioning groove 122 of the supporting rod 12. Therefore, the user can adjust the level of the pontoon 15. After adjusting to a desire level, the pressable button 13 is released. Then the elastomer 143 of the positioning seat 14 restores to drive the block 141 to be buckled to the positioning groove 1220 of the supporting rod 12. After the level positioning operation is completed, and when it is stated to fill water into a water box 3, the pontoon 15 will move to a predetermined height due to the buoyance of water, the pontoon 15 will drive the press 11 to press the water stop pin 222 of the water supply 2.

Thereby, by the present invention, the amount of water in the water box can be precisely controlled and the operation is easy without any other auxiliary tool. No problem of element fatigue and change of water level occurs.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A level adjuster of a water supply of a water box comprising a press, a supporting rod, an pressable button, a positioning seat, a pontoon, an inner water injecting tube and an outer water injecting tube of a water injector; wherein:

the press has a first inserting hole at a front section thereof; the first inserting hole is pivotally connected to a positioning hole of the water supply by a first pin; a distal end of the press is installed with a second inserting hole which is pivotally connected to a pivotal hole at a top end of the supporting rod by a second pin;

the supporting rod has a top installed with the pivotal hole corresponding to the second inserting hole of the press; an inner side of the supporting rod is installed with a groove row formed by at least one positioning groove; thereby, the positioning block of the positioning seat is capable of being buckled to the positioning groove;

the pressable button has an inner side which is installed with a engaging hole for being inserted by a connecting post of a positioning seat; an upper and a lower side of the pressable button are installed with corresponding notches for confining the movement of the pressable button and the supporting rod; and the positioning seat has a transversal plate with two posts at two ends of the plate; each post is installed with an elastomer; a positioning block capable of buckling the supporting rod and the positioning groove are installed between two connecting posts;

the pontoon has a round hole at one side for being inserted by an outer water injecting tube of the water supply; another side of the pontoon is installed with a via hole for being inserted by the supporting rod; one lateral side of the via hole is communicated with an opened receiving chamber for receiving the pressable button.

2. The level adjuster of a water supply of a water box as claimed in claim 1, wherein the groove row of the supporting rod has an upper limiting block at an upper side thereof and a lower end of the supporting rod is pivotally connected with a lower limiting block which are utilized as an upper limit and a lower limit of the position pressable button as the pressable button moves along the supporting rod.

* * * * *